(12) United States Patent
Gu et al.

(10) Patent No.: US 12,180,076 B2
(45) Date of Patent: Dec. 31, 2024

(54) METHOD FOR PREPARING EXPANDED FOAMED GRAPHITE FILM

(71) Applicant: GuangDong Suqun New Material Co., Ltd, Guangdong (CN)

(72) Inventors: Zhoujie Gu, Guangdong (CN); Teng Lv, Guangdong (CN); Xiaoyong Guo, Guangdong (CN); Hao Wang, Guangdong (CN); Zeming Ren, Guangdong (CN)

(73) Assignee: GuangDong Suqun New Material Co., Ltd, Guangdong (CN)

( * ) Notice: Subject to any disclaimer, the term of this patent is extended or adjusted under 35 U.S.C. 154(b) by 0 days.

(21) Appl. No.: 18/613,339

(22) Filed: Mar. 22, 2024

(65) Prior Publication Data

US 2024/0359990 A1 Oct. 31, 2024

(30) Foreign Application Priority Data

Apr. 25, 2023 (CN) .......................... 202310457085.5

(51) Int. Cl.
*C01B 32/225* (2017.01)
*C01B 32/205* (2017.01)

(52) U.S. Cl.
CPC .......... *C01B 32/225* (2017.08); *C01B 32/205* (2017.08); *C01P 2004/03* (2013.01); *C01P 2006/32* (2013.01)

(58) Field of Classification Search
CPC . C01B 32/205; C01B 32/225; C01P 2004/03; C01P 2006/32
See application file for complete search history.

(56) References Cited

U.S. PATENT DOCUMENTS

| 7,071,258 | B1 * | 7/2006 | Jang | C01B 32/15 423/445 B |
| 8,865,111 | B2 * | 10/2014 | Nishikawa | C04B 35/522 423/448 |
| 10,589,998 | B2 | 3/2020 | Rich et al. | |
| 10,822,239 | B2 * | 11/2020 | Lin | C01B 32/194 |
| 2004/0127621 | A1 * | 7/2004 | Drzal | C08K 3/04 524/424 |

(Continued)

FOREIGN PATENT DOCUMENTS

CN 102897753 A 1/2013
CN 108862271 A * 11/2018

(Continued)

OTHER PUBLICATIONS

Tang, Qunwei, et al. "Crystallization degree change of expanded graphite by milling and annealing." Journal of alloys and compounds 475.1-2 (2009): 429-433.*

(Continued)

*Primary Examiner* — Richard M Rump
(74) *Attorney, Agent, or Firm* — Cooper Legal Group, LLC (57) ABSTRACT

A method for preparing expanded foamed graphite film includes the following steps: Step A: impregnating a synthetic graphite film into an intercalator for an interlayer intercalation treatment to prepare an intercalated graphite film; Step B: performing a thickness-limited expansion and foaming to the intercalated graphite film obtained in Step A, with an expansion ratio y of 2-25, to obtain an expanded foamed intercalated graphite film.

9 Claims, 2 Drawing Sheets

(56) References Cited

U.S. PATENT DOCUMENTS

2008/0258359 A1* 10/2008 Zhamu .................. B82Y 40/00
264/673

FOREIGN PATENT DOCUMENTS

CN          109911893 A      6/2019
JP           63139081 A  *   6/1988

OTHER PUBLICATIONS

Li, Xiaolin, et al. "Highly conducting graphene sheets and Langmuir-Blodgett films." Nature nanotechnology 3.9 (2008): 538-542.*
Liu, Yuchen, et al. "Synthesis of composite nanosheets of graphene and boron nitride and their lubrication application in oil." Advanced Engineering Materials 20.2 (2018): 1700488.*
First Office Action cited in corresponding Chinese patent Application No. 202310457085.5, dated Nov. 24, 2023, 10 pages.

* cited by examiner

METHOD FOR PREPARING EXPANDED FOAMED GRAPHITE FILM

CROSS-REFERENCE TO RELATED APPLICATION

This application claims the priority to Chinese patent application No. 202310457085.5, filed on Apr. 25, 2023. The entirety of Chinese patent application No. 202310457085.5 is hereby incorporated by reference herein and made a part of this specification.

FIELD OF THE INVENTION

The present application relates to the field of graphite thermally conductive materials, and in particular, to an expanded foamed graphite film, a preparation method and an application thereof in semiconductor heat dissipation devices.

DESCRIPTION OF RELATED ART

With the development of 5G technology, the power density of chips in various electronic devices continues to increase, and the heat dissipation of chips has become one of the choke points in technological development. In order to improve the heat dissipation efficiency of the chip, thermal interface materials (TIM) such as thermal grease, thermal silicone gel and thermal silicone gasket are usually used to fill the gap between the contact surface of the radiator and the chip to reduce the thermal resistance. However, problems such as overflow, dry cracking, and low-molecular siloxane contamination will occur after long-term use of silicon-based materials, which will cause a decrease of the interface gap-filling ability and a decrease of the thermal conduction effect. Therefore, there is an urgent need to develop TIM with good stability.

Synthetic graphite film is a highly crystalline film prepared by carbonization and graphitization high temperature sintering of polyimide film, which has the advantages of good chemical stability, high in-plane thermal conductivity, and light weight, and is an in-plane temperature equalization material widely used in the electronic equipment industry. However, the synthetic graphite film has a low out-plane compressibility, a limited interface gap-filling ability, and low out-plane thermal conductivity, so it is rarely used as a thermal interface material.

In order to improve the compressibility of the synthetic graphite film, in a disclosed patent technology U.S. Pat. No. 10,589,998 B2, a compressible synthetic graphite film was obtained by controlling the temperature of carbonization and graphitization of the polyimide film. However, it needs to be used under a high pressure of 700 kPa, such that the interface thermal resistance does not exceed 0.25° C.·cm$^2$/W. Moreover, a high pressure will cause stress damage to the chip during the installation process of the radiator, limiting the application.

Therefore, in order to expand the application of graphite films, preparing thermally conductive graphite films with low thermal resistance under low pressure has become an important research direction.

BRIEF SUMMARY OF THE INVENTION

In order to solve the thermal conductivity problem of graphite films, the present application provides an expanded and foamed graphite film, a preparation method and an application thereof in semiconductor heat dissipation devices.

In a first aspect, the present application provides a method for preparing an expanded foamed graphite film, adopting the following technical solution:

A method for preparing expanded foamed graphite film, including the following steps:
 Step A: impregnating a synthetic graphite film into an intercalator for an interlayer intercalation treatment to prepare an intercalated graphite film; and
 Step B: performing a thickness-limited expansion and foaming to the intercalated graphite film obtained in Step A, with an expansion ratio y of 2-25, to obtain an expanded foamed intercalated graphite film, wherein y=T2/T1, T1 refers to a first thickness of the intercalated graphite film obtained in Step A, and T2 refers to a second thickness of the expanded foamed intercalated graphite film after the thickness-limited expansion and foaming;
 under the expansion ratio y, a weight of the intercalator inserted in the graphite film x and the expansion ratio y satisfy a formula: y=1036.1x−1.6795.

Since the graphite film is a two-dimensional layered structure material, and has a low interlayer thermal conductivity, the foaming degree and foaming uniformity of the graphite film are regulated by the thickness-limited expansion and foaming, so that the foamed graphite film has better interface gap-filling ability between the chip and the radiator, higher compressibility, low thermal resistance and good thermal conductivity under low pressure.

In the current preparation of graphite film, there will be micro-foaming on the surface of the intermediate product after graphitization, but the degree of foaming is insufficient, and the surface of parts such as chips and radiators has fine concave-convex structures. The graphitization can only render micro-foaming of the surface of the product, which has a low foaming and insufficient surface roughness. Therefore, the surface of the graphite film is not easy to fit with the fine concave-convex structure on the surface of the parts, making it difficult for the graphite film to interface with the surface of the parts. Further, the bonding degree is low, thereby reducing the effect of conducting the heat of the parts by the graphite film.

For example, in a published U.S. Pat. No. 10,589,998B2, the degree of foaming is adjusted by high-temperature sintering and rolling after graphitization, but the degree of foaming is not enough, the surface roughness of the graphite film is not enough, and the fitness with the interface gap on the surface of the parts is poor. It is necessary to press and embed the surface of the graphite film onto the surface of the part under greater pressure to achieve a smaller thermal resistance. However, the pressing operation under greater pressure can easily damage the parts of the chip and the radiator.

In this regard, the present application realizes the interlayer intercalation treatment by impregnating the intercalator into the interior of the synthetic graphite film, and then the intercalator is thermally decomposed to generate gas, and the graphite film is expanded in the expansion and foaming process. Several graphite layers and several graphite branches connected between adjacent graphite layers will be formed in the expansion process of the graphite film.

In order to control the expansion ratio, the graphite film is placed in a foaming fixture with a specific gap (the gap between the upper plate and the lower plate of the foaming fixture is 0.05-0.5 mm). The thickness-limited expansion foaming makes the gas generated during the foaming process of the graphite film diffuses laterally, such that the overall foaming of the graphite film more uniform, an excessive expansion and foaming is prevented, and a reduce of the mechanical properties of the graphite film is avoided. Therefore, the prepared expanded and foamed graphite film has excellent mechanical properties while maintaining higher compression ratio, lower thermal resistance value, and good overall thermal conductivity.

After the expansion and foaming is limited to 2-25 times, the adjacent graphite layers are relatively loose, such that the expanded foamed graphite film has a hollow structure and a relatively rough surface, and is relatively soft. The rough surface can be embedded into chips and radiators, and the tiny concave and convex gaps on the surface, so as to improve the interface bonding force, and achieve a low thermal resistance and an excellent thermal conductivity under low pressure conditions.

Specifically, thermal energy can be conducted in the longitudinal direction to the adjacent graphite layers through several graphite branches, and can be conducted in the transverse direction of the graphite film through the plane layer of the graphite layer, achieving vertical and horizontal heat conduction and improving the heat-conducting property of the graphite film layer. Under the same operating pressure, the non-expanded foamed graphite film is more difficult to be compressed, has a greater thermal resistance and lower thermal conductivity.

In some embodiments, in Step A, a method for preparing the synthetic graphite film includes the following steps: carbonizing and graphitizing a polyimide film successively to obtain the synthetic graphite film.

In some embodiments, the synthetic graphite film has an in-plane thermal conductivity of 800-1800 W/m·K, and a density of 0.5-2.2 g/cm$^3$.

The synthetic graphite film produced by carbonization and graphitization has a higher thermal conductivity than natural graphite film and more stable mechanical properties than natural graphite film. The synthetic graphite film is then subjected to thickness-limited expansion foaming to obtain an expanded foamed graphite film with the characteristics of high compressibility, low thermal resistance and good thermal conductivity. In particular, a carbonization temperature is 1300-1800° C., and a graphitization temperature is 2500-3000° C.

In some embodiments, in Step A, the intercalator includes one or more selected from the group consisting of hydrogen peroxide, ammonium persulfate, perchloric acid, concentrated sulfuric acid, acetic acid, phosphoric acid, concentrated nitric acid, and potassium permanganate.

Above-mentioned intercalator composition can penetrate into the interior of the graphite film during the impregnation process, and after the graphite film is heated, the above-mentioned intercalator decomposes to generate gas, which diffuses evenly from the interior of the graphite film, such that the graphite film expands and foams.

In some embodiments, in Step A, an impregnation time for the interlayer intercalation treatment is 0.5-60 min, and an impregnation temperature for the interlayer intercalation treatment is 10-50° C.

By adopting the above technical solution, the intercalator can be fully impregnated into the interior of the graphite layer. The longer the impregnation time for the intercalation treatment, the more the intercalator enters the interlayer of graphite, and the greater the degree of subsequent expansion and foaming. Therefore, the impregnation time and impregnation temperature for the interlayer intercalation treatment can be controlled according to the original thickness and the required expanded thickness of the expanded and foamed graphite film, so that the expansion and foaming can proceed stably.

In some embodiments, in Step B, the thickness-limited expansion foaming is a high-temperature expansion treatment or a microwave expansion treatment; the high-temperature expansion treatment has a processing temperature of 300-1000° C. and a processing period of 0.2-5 min, and the microwave expansion treatment has a processing power of 500-5000 W and a processing period of 0.5-10 min.

By adopting the above-mentioned high-temperature treatment or microwave treatment, the graphite film can be evenly heated, and the intercalator is decomposed to generate gas, so that the graphite film can be expanded and foamed uniformly, and the obtained expanded and foamed graphite film has uniform thickness and uniform heat conduction.

In some embodiments, in Step A, the intercalator further includes a metal salt, and the metal salt accounts for 0.01-5% of a total mass of the intercalator.

By adopting the above technical solution, metal ions can be doped between the graphite layers during the interlayer intercalation treatment. Under the high temperature conditions of the expansion and foaming process, the metal salts are decomposed into metal oxides. During the subsequent reduction reaction treatment, metal oxides and graphite undergo a reduction reaction under reducing conditions to generate metal simple substance particles and carbon monoxide, so that a graphite film doped with metal particles between graphite layers is obtained, improving the thermal conductivity of the graphite film with the help of doped metals.

In some embodiments, the metal salt includes one or more selected from the group consisting of ferric chloride, copper chloride, zinc chloride, copper sulfate, copper nitrate, silver nitrate, ferric sulfate, ferrous sulfate, ferric nitrate, and nickel sulfate.

Above-mentioned metal salt can be uniformly dispersed in the intercalator. During the process of impregnating and dispersing the intercalator into the graphite film, the metal salt is then dispersed into the interlayer of the graphite film. Further, above-mentioned metal salts decompose into metal oxides under the high temperature conditions of the expansion and foaming and form metal simple substance particles after reduction treatment.

In some embodiments, after the Step B, the method for preparing an expanded foamed graphite film further includes Step C: performing a reduction treatment to the expanded foamed intercalated graphite film after the thickness-limited expansion and foaming of Step B, under a reduction temperature of 500-1200° C.

By adopting the above technical solution, the metal oxide formed during the expansion and foaming process can be fully reduced into metal particles. The reduction reaction can be carried out in a pure nitrogen atmosphere, or in a hydrogen/nitrogen mixed atmosphere, and the hydrogen volume proportion is controlled at 1-10%. The safety problem of high-concentration hydrogen explosion at high temperature can be avoided under a stable reduction atmosphere.

In some embodiments, in Step A, the intercalator further includes nitrogen-boron-carbon thermal-conductive particles, and the nitrogen-boron-carbon thermal-conductive particles accounts for 0.01-5% of the total mass of the intercalator.

In some embodiments, the nitrogen-boron-carbon thermal-conductive particles includes one or more selected from the group consisting of boron nitride, boron carbide, silicon carbide, aluminum nitride, and silicon nitride.

By adopting the above technical solution, nitrogen-boron-carbon thermal-conductive particles can be doped between the graphite film layers to improve the heat transfer and thermal conductivity between the graphite film layers.

In a second aspect, the present application provides an expanded foamed graphite film prepared based on the above method, adopting the following technical solution:

the expanded foamed graphite film has a compressibility of greater than 10% and an area thermal resistance of less than 0.78° C.·cm$^2$/W under a pressure of 30 psi. The expanded foamed graphite film is specifically made by impregnating the intercalator without adding metal salts or nitrogen-boron-carbon thermal-conductive particles, and then expanding and foaming by thickness-limited expansion and foaming.

Another solution is: the expanded foamed graphite film has a compressibility of greater than 10% and an area thermal resistance of less than 0.70° C.·cm$^2$/W under a pressure of 30 psi. The preparation method specifically includes performing an impregnation treatment with addition of metal salts to the intercalator, and then performing thickness-limited expansion foaming and reduction treatment.

Another solution is: the expanded foamed graphite film has a compressibility of greater than 10% and an area thermal resistance of less than 0.65° C.·cm$^2$/W under a pressure of 30 psi. The preparation method specifically includes performing an impregnation treatment with addition of nitrogen-boron-carbon thermal-conductive particles to the intercalator, and then performing thickness-limited expansion and foaming.

The expanded foamed graphite film produced by adopting the above technical solution has a high compression ratio, a small thermal resistance, and a good thermal conductivity under low pressure. It can be used for heat dissipation of a variety of small accessories and is not prone to stress damage to chips and other accessories.

In a third aspect, the present application provides a semiconductor heat dissipation device, adopting the following technical solution:

a semiconductor heat dissipation device, including a foamed graphite film, a chip and a radiator. The chip is packaged on the surface of the radiator, and the foamed graphite film is sandwiched between the chip and the radiator; the foamed graphite film is the above-mentioned expanded foamed graphite film.

By adopting the above technical solution, the expanded foamed graphite film can be stably disposed between the chip and the radiator under low pressure, which will not cause stress damage to the chip or radiator due to excessive pressure. The heat energy generated by the working process of the chip is transferred to the radiator, and then dissipated through the radiator.

In summary, the application can achieve at least one of the following beneficial effects:

1. In the preparation method of the present application, the intercalator impregnated into the interior of the synthetic graphite film is thermally decomposed to generate gas during the expansion and foaming process, thereby expanding between the internal layers of the graphite film. By controlling the thickness of the expansion and foaming, the gas generated during the foaming process of the graphite film diffuses laterally, such that the overall foaming of the graphite film more uniform, an excessive expansion and foaming is prevented, and a reduce of the mechanical properties of the graphite film is avoided. Therefore, the prepared expanded and foamed graphite film has higher compression ratio, lower thermal resistance value, and good thermal conductivity at low pressure.

2. In the present application, by adding metal salts to the intercalator, the metal ions can be impregnated between the graphite layers during the interlayer intercalation treatment. The metal ions then undergo reduction treatment after expansion and foaming, so that the metal salts are decomposed into metal oxides in the expansion and foaming process. The metal oxide, in the reduction treatment, is reduced to metal simple substance particles, and then a graphite film doped with metal particles between graphite layers can be obtained. The thermal conductivity of the graphite film can be improved by means of the doped metal.

3. In the present application, by adding nitrogen-boron-carbon thermal-conductive particle to the intercalator, nitrogen-boron-carbon thermal-conductive particles can be doped between the graphite film layers to improve the heat transfer and thermal conductivity between the graphite film layers.

DETAILED DESCRIPTION

Figure 1:
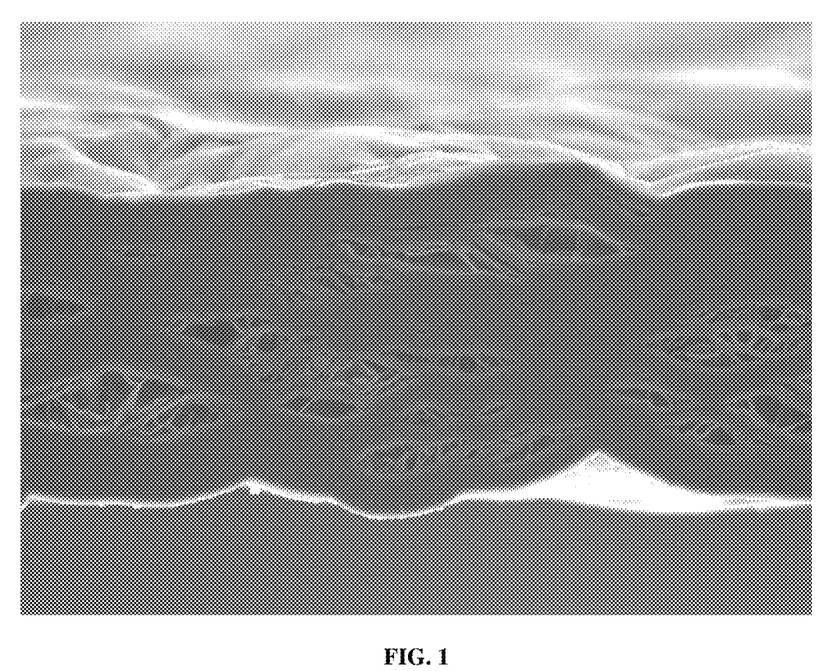
FIG. 1 is a cross-sectional SEM image of the synthetic graphite film before expansion and foaming in Example 1 of the present application.
Figure 2:
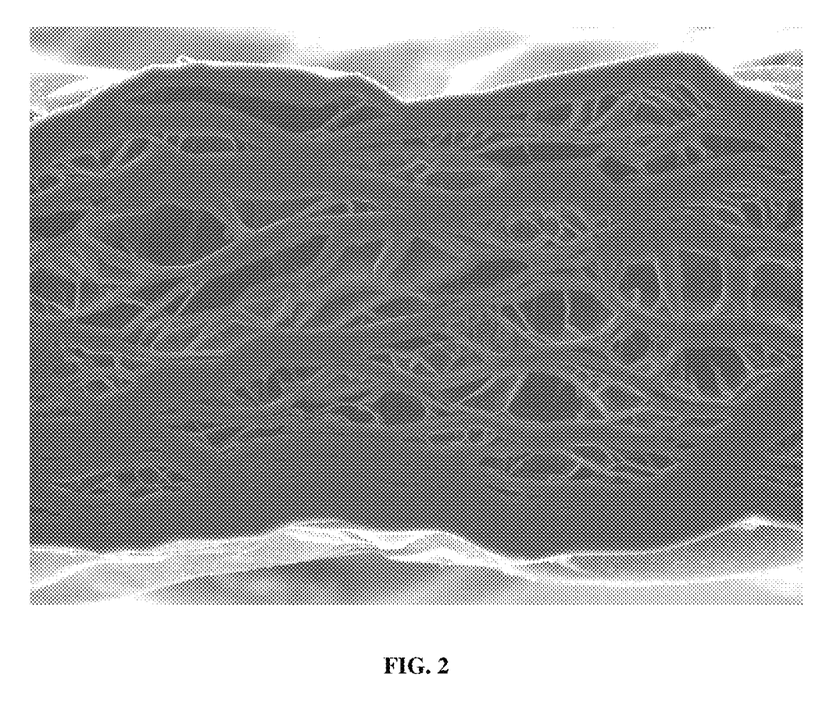
FIG. 2 is a cross-sectional SEM image of the expanded and foamed synthetic graphite film in Example 1 of the present application.

The present application will be further described in detail below in combination with FIGS. 1-3 and Examples.

Preparation Example of Intercalators

Preparation Example 1

An intercalator was prepared by mixing concentrated sulfuric acid and concentrated nitric acid. The specific steps were as follows:

255 mL of concentrated sulfuric acid was slowly added into 45 mL of concentrated nitric acid in an ice-water bath, while stirring and evenly mixing, to obtain an intercalator.

Preparation Example 2

An intercalator was prepared by mixing concentrated sulfuric acid and hydrogen peroxide. The specific steps were as follows:

180 mL of concentrated sulfuric acid was slowly added into 120 mL of hydrogen peroxide in an ice-water bath, while stirring and evenly mixing, to obtain an intercalator.

Preparation Example 3

An intercalator was prepared by mixing metal salt, concentrated sulfuric acid and concentrated nitric acid. The specific steps were as follows:

255 mL of concentrated sulfuric acid was slowly added into 45 mL of concentrated nitric acid in an ice-water bath, while stirring and evenly mixing; then 0.5 g of copper sulfate was added, while stirring, to obtain an intercalator containing copper ions.

Preparation Example 4

An intercalator was prepared by mixing metal salt, concentrated sulfuric acid and potassium permanganate. The specific steps were as follows:

270 mL of concentrated sulfuric acid was slowly added into 30 mL of potassium permanganate in an ice water bath, while stirring and evenly mixing; then 6 g of silver nitrate was added, while stirring, to obtain an intercalator containing silver ions.

Preparation Example 5

An intercalator was prepared by mixing nitrogen-boron-carbon thermal-conductive particles, concentrated sulfuric acid, and concentrated nitric acid. The specific steps were as follows:

210 mL of concentrated sulfuric acid was slowly added into 90 mL of concentrated nitric acid in an ice water bath, while stirring and evenly mixing; then 15 g of boron nitride was added, while stirring, to obtain an intercalator containing boron nitride.

Preparation Example 6

An intercalator was prepared by mixing nitrogen-boron-carbon thermal-conductive particles, concentrated sulfuric acid, and concentrated nitric acid. The specific steps were as follows:

200 mL of concentrated sulfuric acid was slowly added into 100 mL of perchloric acid in an ice water bath, while stirring and evenly mixing; then 3 g of boron carbide was added, while stirring, to obtain an intercalator containing boron carbide.

EXAMPLES

Example 1

An expanded foamed graphite film was prepared by the following steps:

Preparation of synthetic graphite film: the polyimide film was carbonized at a temperature of 1500° C., graphitized at a temperature of 2800° C., then cooled and discharged to obtain a synthetic graphite film. FIG. 1 is a cross-sectional SEM image of the synthetic graphite film, in which the interlayer connections are tight.

Intercalation treatment: a synthetic graphite film with a thickness of 17 μm was cut into a size of 10 cm*10 cm, and then the cut synthetic graphite film was impregnated into the intercalator of Preparation example 1 at 20° C. for 20 minutes, taken out, washed with deionized water to remove excess intercalator on the surface of the synthetic graphite film, and dried at 90° C. for 0.5 h to prepare an intercalated graphite film.

Thickness-limited expansion: the intercalated graphite film was placed in a height-limited mold with an inner cavity height of 0.2 mm, and then the height-limited mold was placed in an expansion furnace for high-temperature expansion at a temperature of 750° C. for 20 seconds to obtain an expanded foamed graphite film with a thickness of 197 μm. FIG. 2 is a cross-sectional SEM image of the expanded foamed graphite film after expansion and foaming. It can be seen that there are several loose pores and graphite branches inside, and multiple graphite layers are connected together by the several graphite branches.

Example 2

An expanded foamed graphite film was prepared by the following steps:

Preparation of synthetic graphite film: the polyimide film was carbonized at a temperature of 1300° C., graphitized at a temperature of 2500° C., then cooled and discharged to obtain a synthetic graphite film.

Intercalation treatment: a synthetic graphite film with a thickness of 33 μm was cut into a size of 10 cm*10 cm, and then the cut synthetic graphite film was impregnated into the intercalator of Preparation example 2 at 50° C. for 30 seconds, taken out, washed with deionized water to remove excess intercalator on the surface of the synthetic graphite film, and dried at 90° C. for 0.5 h to prepare an intercalated graphite film.

Thickness-limited expansion: the intercalated graphite film was placed in a height-limited mold with an inner cavity height of 0.5 mm, and then the height-limited mold was placed in an expansion furnace for high-temperature expansion at a temperature of 1000° C. for 20 seconds to obtain an expanded foamed graphite film with a thickness of 502 μm.

Example 3

An expanded foamed graphite film was prepared by the following steps:

Preparation of synthetic graphite film: the polyimide film was carbonized at a temperature of 1800° C., graphitized at a temperature of 3000° C., then cooled and discharged to obtain a synthetic graphite film.

Intercalation treatment: a synthetic graphite film with a thickness of 75 μm was cut into a size of 10 cm*10 cm, and then the cut synthetic graphite film was impregnated into the intercalator of Preparation example 3 at 20° C. for 3 minutes, taken out, washed with deionized water to remove excess intercalator on the surface of the synthetic graphite film, and dried at 90° C. for 0.5 h to prepare an intercalated graphite film.

Thickness-limited expansion: the intercalated graphite film was placed in a height-limited mold with an inner cavity height of 0.1 mm, and then the height-limited mold was placed in an expansion furnace for high-temperature expansion at a temperature of 650° C. for 10 seconds to obtain an expanded foamed graphite film.

Reduction treatment: the expanded foamed graphite film was placed in a hydrogen/nitrogen mixed atmosphere with a hydrogen volume ratio of 3% for reduction treatment, and the reduction temperature was 250° C.

Example 4-7

The difference between Examples 4-7 and Example 3 lied in the impregnation time. In particular, the synthetic graphite film of Example 4 was impregnated into the intercalator of Preparation example 3 for 5 minutes, the synthetic graphite film of Example 5 was impregnated into the intercalator of Preparation example 3 for 10 minutes, the synthetic graphite film of Example 6 was impregnated into the intercalator of Preparation example 3 for 15 minutes, and the synthetic graphite film of Example 7 was impregnated into the intercalator of Preparation example 3 for 20 minutes.

The weight of the synthetic graphite film before impregnation, the thickness of the synthetic graphite film before impregnation, the weight of the intercalated graphite film after impregnation and drying, and the thickness of the graphite film after expansion and foaming in Examples 3-7 were determined, and recorded in the following table 1:

TABLE 1 preparation parameters of the expanded foamed graphite film in Examples 3-7

| | Items | Example 3 | Example 4 | Example 5 | Example 6 | Example 7 |
|---|---|---|---|---|---|---|
| Interlayer intercalation treatment | Mass of the synthetic graphite m1(g) | 0.07273 | 0.0666 | 0.0677 | 0.06533 | 0.07362 |
| | Thickness of the synthetic graphite T1(μm) | 75 | 75 | 75 | 75 | 75 |
| | Impregnation period in the intercalator (min) | 3 | 5 | 10 | 15 | 20 |
| | Mass of the intercalated graphite film after drying m2(g) | 0.0753 | 0.07107 | 0.07242 | 0.07196 | 0.08664 |
| | Mass of the intercalator loaded in the graphite film m(g) | 0.00257 | 0.00447 | 0.00472 | 0.00663 | 0.01302 |
| expansion and foaming treatment | Expansion and foaming temperature (° C.) | 650 | 650 | 650 | 650 | 650 |
| | Expansion and foaming period (s) | 10 | 10 | 10 | 10 | 10 |
| | Inner cavity height of the height-limited mold (mm) | 0.1 | 0.2 | 0.25 | 0.4 | 0.9 |
| | Thickness of the graphite film after expansion and foaming T2(μm) | 104 | 186 | 244 | 383 | 894 |
| | Expansion and foaming ratio E | 1.39 | 2.48 | 3.25 | 5.11 | 11.92 |
| Reduction treatment | Reduction atmosphere | 3% $H_2$ + 97% $N_2$ | 100% $N_2$ | 100% $N_2$ | 1% $H_2$ + 99% $N_2$ | 8% $H_2$ + 92% $N_2$ |
| | Reduction temperature/° C. | 500 | 800 | 1200 | 700 | 500 |

In the above table 1, the mass of the intercalator loaded in the graphite film m=the mass of the intercalated graphite after drying m2–the mass of the synthetic graphite m1, and the expansion and foaming ratio E=the thickness of the graphite film after expansion and foaming T2/the thickness of the synthetic graphite T1.

Based on the mass m of the intercalator loaded in the graphite film and the expansion and foaming ratio in the above Examples 3-7, the relationship between the mass m of the intercalator loaded and the expansion ratio E is calculated as: E=1036.1m–1.6795. It can be seen that the longer the impregnation time of the interlayer intercalation treatment of the graphite film, the more intercalator is immersed, which will promote the expansion and foaming ratio.

Example 8-10

The difference between Examples 8-10 and Example 1 is that the sources of the intercalators are different and the condition parameters of the preparation steps are different. For details, see Table 2 below:

TABLE 2

Comparison table of condition parameters of Examples 1, 2, 8-10

| | Items | Example 1 | Example 2 | Example 8 | Example 9 | Example 10 |
|---|---|---|---|---|---|---|
| | Thickness of the synthetic graphite film/μm | 17 | 33 | 50 | 33 | 75 |
| Intercalation treatment | Source of the intercalator | Preparation example 1 | Preparation example 2 | Preparation example 4 | Preparation example 5 | Preparation example 6 |
| | Impregnating temperature for the interlayer intercalation/° C. | 20 | 40 | 10 | 50 | 20 |
| | Impregnating period for the interlayer intercalation/min | 20 | 30 | 60 | 1 | 40 |
| | Drying temperature after the impregnating/° C. | 90 | 90 | 90 | 90 | 90 |
| | Drying period after the impregnating/h | 0.5 | 0.5 | 0.5 | 0.5 | 0.5 |
| | Inner cavity height of the height-limited mold/mm | 0.2 | 0.5 | 0.8 | 0.5 | 0.5 |
| Thickness-limited expansion | Expansion and foaming condition | High temperature expansion 750° C./20 s | High temperature expansion 1000° C./20 s | Microwave expansion 500 W/10 min | Microwave expansion 5000 W/30 s | High temperature expansion 300° C./8 min |
| | Thickness of the expanded foamed graphite film/μm | 197 | 502 | 789 | 508 | 485 |
| Reduction | Reduction atmosphere | / | / | 10% $H_2$ + 90% $O_2$ | / | / |
| | Reduction temperature/° C. | / | / | 500 | / | / |

COMPARATIVE EXAMPLE

Comparative Example 1

An expanded graphite thermal interface material was prepared by the following steps:

10 sheets of graphite films with a single thickness of 25 μm and a plane size of 10×10 cm was selected, a total mass of which was 3.76 g. The graphite film was laid flat on the bottom of the mold, hydrogen peroxide was added and then concentrated sulfuric acid was added, where the volume ratio of hydrogen peroxide and concentrated sulfuric acid is 1:5. The graphite film rapidly expands into expandable graphite, and the expansion factor of the graphite film is adjusted to 400 times by adjusting the position of the glass cover. The expandable graphite was cleaned with deionized water until it is neutral, and the neutral expandable graphite was dried at high temperature to obtain expanded graphite;

0.5 g of silane coupling agent was hydrolyzed in a mixed solution of deionized water and absolute ethanol with a volume ratio of 0.2, and hydrolyzed at 80° C. for 20 hours;

The 400 times expanded graphite was cut into 4×4×4 cm expanded graphite blocks and immersed in the silane coupling agent hydrolyzate, soaked and reacted at 80° C. for 4 hours, and then cleaned with absolute ethanol for 4-7 times. After the surface treatment, the expanded graphite was dried at low temperature, vacuum infiltrated in a mixture of 30 g of polyolefin and acetone, and cured at high temperature to obtain a composite material. The composite material was cut into standard sizes to obtain a thermally conductive pad.

Comparative Example 2

The difference between this comparative example and Example 3 is that: the intercalated graphite film obtained by the intercalation treatment was directly expanded at a high temperature of 650° C. for 10 seconds, that is, the intercalated graphite film obtained by the intercalation treatment was not placed in a height-limited mold for thickness-limited expansion. The prepared expanded foamed graphite film had a thickness of 8.2 mm.

Application Example

Figure 3:
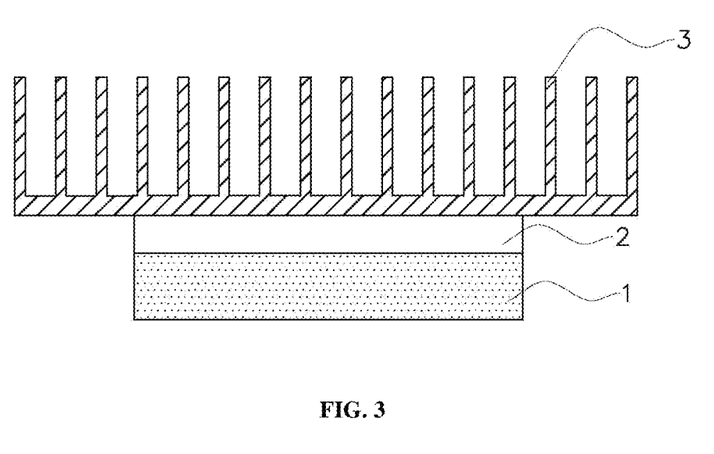
FIG. 3 is a schematic structural diagram of a semiconductor heat dissipation device according to Application example 1 of the present application.

A semiconductor heat dissipation device, referring to FIG. 3, includes a chip 1, a foamed graphite film 2 and a radiator 3 arranged in sequence. The foamed graphite film 2 is an expanded foamed graphite film prepared in any one of Examples 1-10.

The Performance Detection Test

The Examples 1-10 and the Comparative example 1-2 are carried out the measurement and calculation of the compressibility and the area thermal resistance value, and the test and calculation results are shown in Table 3 below:

(I) Detection Method (1) The compressibility was determined according to the standard "JB/T9141.4-1999 Test method for compressibility and recovery of flexible graphite sheets", a pressure of 30 psi was applied to the graphite film sample, maintained for 15 seconds and then released. The thickness $t_1$ of the graphite film sample after releasing the pressure 60 seconds was recorded, and the compressibility C was calculated based on the following formula:

$$\text{Compressibility } C = (t_0 - t_1)/t_0 * 100\%.$$

In particular, $t_1$ is the thickness of the graphite film sample after being applied pressure (μm); $t_0$ is the original thickness of the graphite film sample (μm).

(2) Area thermal resistance value: the thermal conductivity of the graphite film sample was determined according to the standard "GB/T8722-2008 Method for the determination of thermal conductivity of graphite materials at median temperature"; then the area thermal resistance value θ was calculated based on the following formula:

$$\text{Area thermal resistance } \theta = L/(\lambda S);$$

In particular, $\lambda$ is the determined thermal conductivity, L is the thickness of the expanded graphite film, and S is the heat transfer area of the graphite film.

(2) Test and Calculation Results

TABLE 3

Performance data table of Examples 1-10 and Comparative Examples 1-2

| items | Compressibility C/% | Area thermal resistance value θ/ (° C. · cm²/W) |
|---|---|---|
| Example 1 | 12 | 0.75 |
| Example 2 | 11 | 0.78 |
| Example 3 | 16 | 0.65 |
| Example 4 | 15 | 0.62 |
| Example 5 | 14 | 0.60 |
| Example 6 | 13 | 0.68 |
| Example 7 | 11 | 0.62 |
| Example 8 | 16 | 0.67 |
| Example 9 | 12 | 0.41 |
| Example 10 | 13 | 0.36 |
| Comparative example 1 | 4 | 0.92 |
| Comparative example 2 | 6 | 1.18 |

From the data in Table 3 above, it can be seen that, using a synthetic graphite film with an original thickness of 15-75 μm, the thickness of the expanded graphite film is generally 100-800 μm, and the expansion ratio is 1-25, such as foaming from 33 μm to 500 μm, and foaming from 70 μm to 400 μm. The compressibility of the prepared expanded foamed graphite film is greater than 10% under a pressure of 30 psi. The area thermal resistance of the expanded foamed graphite film without doped metal particles and nitrogen-boron-carbon thermal-conductive particles in Example 1-2 is less than 0.78° C.·cm²/W, the area thermal resistance of the expanded foamed graphite film doped with metal particles in Examples 3-8 is less than 0.70° C.·cm²/W, and the area thermal resistance of the expanded foamed graphite film doped with nitrogen-boron carbon thermal-conductive particles in Examples 9-10 is less than 0.65° C.·cm²/W. It can be seen from Examples 3-7 that the longer the impregnation time of the intercalator is, the more metal ions are infiltrated into the graphite film. After expansion, foaming and reduction treatment, the lower the area thermal resistance of the expanded graphite film, the better the heat conduction effect.

In Comparative example 1, the graphite film is expanded 400 times, and its compressibility is significantly lower than that of the example of the present application, and the area thermal resistance value is also significantly increased. In Comparative example 2, the graphite film is expanded and foamed without thickness limit, and the expansion ratio is 109 times, the compressibility is significantly lower than that of Example 3, and the area thermal resistance value is also significantly increased, indicating that the graphite film can be foamed evenly by thickness-limited foaming in the present application. The prepared expanded foamed graphite film has a high compressibility under low pressure, low thermal resistance and good thermal conductivity.

The above specific embodiments are merely provided for an explanation to the present application, rather than imposing a limitation thereto. Upon reading the specification, those skilled in the art can make modifications to the embodiment based on needs without paying any creative contribution, which, as long as falling within the scope defined by the claims of the present application, will be protected by the patent law.

LISTING OF REFERENCE SIGNS 1. chip;
2. foamed graphite film; and
3. radiator.

What is claimed is:

1. A method for preparing an expanded foamed graphite film, comprising the following steps:
   Step A: impregnating a synthetic graphite film into an intercalator for an interlayer intercalation treatment to prepare an intercalated graphite film; and
   Step B: performing a thickness-limited expansion and foaming to the intercalated graphite film obtained in the Step A, with an expansion ratio y of 2-25, to obtain an expanded foamed intercalated graphite film, wherein y=T2/T1, T1 refers to a first thickness of the intercalated graphite film obtained in the Step A, and T2 refers to a second thickness of the expanded foamed intercalated graphite film after the thickness-limited expansion and foaming;
   wherein in the Step A, the intercalator comprises conductive particles, and the conductive particles account for 0.01-5% of a total mass of the intercalator;
   wherein the conductive particles comprise one or more selected from the group consisting of boron nitride, boron carbide, silicon carbide, aluminum nitride, and silicon nitride.

2. A method for preparing an expanded foamed graphite film according to claim 1, wherein in the Step A, a method for preparing the synthetic graphite film comprises the following steps: carbonizing and graphitizing a polyimide film successively to obtain the synthetic graphite film.

3. A method for preparing an expanded foamed graphite film according to claim 1, wherein in the Step A, the intercalator further comprises one or more selected from the group consisting of hydrogen peroxide, ammonium persulfate, perchloric acid, concentrated sulfuric acid, acetic acid, phosphoric acid, concentrated nitric acid, and potassium permanganate.

4. A method for preparing an expanded foamed graphite film according to claim 1, wherein in the Step B, the thickness-limited expansion and foaming is a high-temperature expansion treatment or a microwave expansion treatment; the high-temperature expansion treatment has a processing temperature of 300-1000° C. and a processing period of 0.2-5 min, and the microwave expansion treatment has a processing power of 500-5000 W and a processing period of 0.5-10 min.

5. A method for preparing an expanded foamed graphite film according to claim 1, wherein in the Step A, the intercalator further comprises a metal salt, and the metal salt accounts for 0.01-5% of the total mass of the intercalator.

6. A method for preparing an expanded foamed graphite film according to claim 5, wherein after the Step B, the method for preparing an expanded foamed graphite film further comprises Step C: performing a reduction treatment to the expanded foamed intercalated graphite film after the thickness-limited expansion and foaming of the Step B, under a reduction temperature of 500-1200° C.

7. A method for preparing an expanded foamed graphite film according to claim 1, wherein the synthetic graphite film has an in-plane thermal conductivity of 100-1800 W/m·K, and a density of 0.3-2.2 g/cm³.

8. A method for preparing an expanded foamed graphite film according to claim 1, wherein in the Step A, an impregnating period for the interlayer intercalation treatment is 0.5-60 min, and an impregnating temperature for the interlayer intercalation treatment is 10-50° C.

9. A method for preparing an expanded foamed graphite film according to claim 5, wherein the metal salt comprises one or more selected from the group consisting of ferric chloride, copper chloride, zinc chloride, copper sulfate, copper nitrate, silver nitrate, ferric sulfate, ferrous sulfate, ferric nitrate, and nickel sulfate.

* * * * *